United States Patent

Wagner

[11] Patent Number: 6,123,112
[45] Date of Patent: Sep. 26, 2000

[54] FLUID LINE WITH INTEGRATED UNPRESSURIZED RETURN FLOW

[75] Inventor: Heinz-Hermann Wagner, Mülheim, Germany

[73] Assignee: Simens Aktiengesellschaft, Munich, Germany

[21] Appl. No.: 09/043,772
[22] PCT Filed: Sep. 13, 1996
[86] PCT No.: PCT/DE96/01731
§ 371 Date: Oct. 2, 1998
§ 102(e) Date: Oct. 2, 1998
[87] PCT Pub. No.: WO97/12165
PCT Pub. Date: Apr. 3, 1997

[30] Foreign Application Priority Data

Sep. 28, 1995 [DE] Germany .......................... 195 36 219

[51] Int. Cl.[7] ...................................................... F16L 9/18
[52] U.S. Cl. ............................ 138/114; 138/117; 138/148
[58] Field of Search ................................... 138/114, 117, 138/148

[56] References Cited

U.S. PATENT DOCUMENTS

| | | | |
|---|---|---|---|
| 383,536 | 5/1888 | Newman | 138/114 |
| 1,954,454 | 4/1934 | McFarland | 138/148 |
| 2,181,002 | 11/1939 | Warner | 138/114 |
| 2,289,401 | 7/1942 | Yost | 138/148 |
| 2,325,465 | 7/1943 | Bannister | 138/114 |
| 2,475,635 | 7/1949 | Parsons | 138/114 |
| 2,761,425 | 9/1956 | Bertsch et al. | 138/114 |
| 2,838,074 | 6/1958 | Lauck | 138/114 |
| 3,719,251 | 3/1973 | Hedrick | 138/114 |
| 4,183,351 | 1/1980 | Hinotani et al. | 138/114 |
| 5,456,502 | 10/1995 | Sharp | 138/114 |
| 5,720,325 | 2/1998 | Grantham | 138/114 |

*Primary Examiner*—James Hook
*Attorney, Agent, or Firm*—Herbert L. Lerner; Laurence A. Greenberg; Werner H. Stemer

[57] ABSTRACT

The invention relates to a fluid conduit (9) for hydraulic regulating devices of machines, in particular turbo machines, preferably of industrial turbines, the fluid conduit (9) comprising at least one pressure-transmitting inner conduit (4), which is surrounded by a hydraulically leaktight, burst-proof jacket (5). The space between the inner conduit (4) and the jacket (5) forms an unpressurized outer conduit (6), making it possible to dispense with a separate return conduit while reliably preventing fluid from escaping in the case of leaks in the pressure-transmitting inner conduit (4).

7 Claims, 1 Drawing Sheet

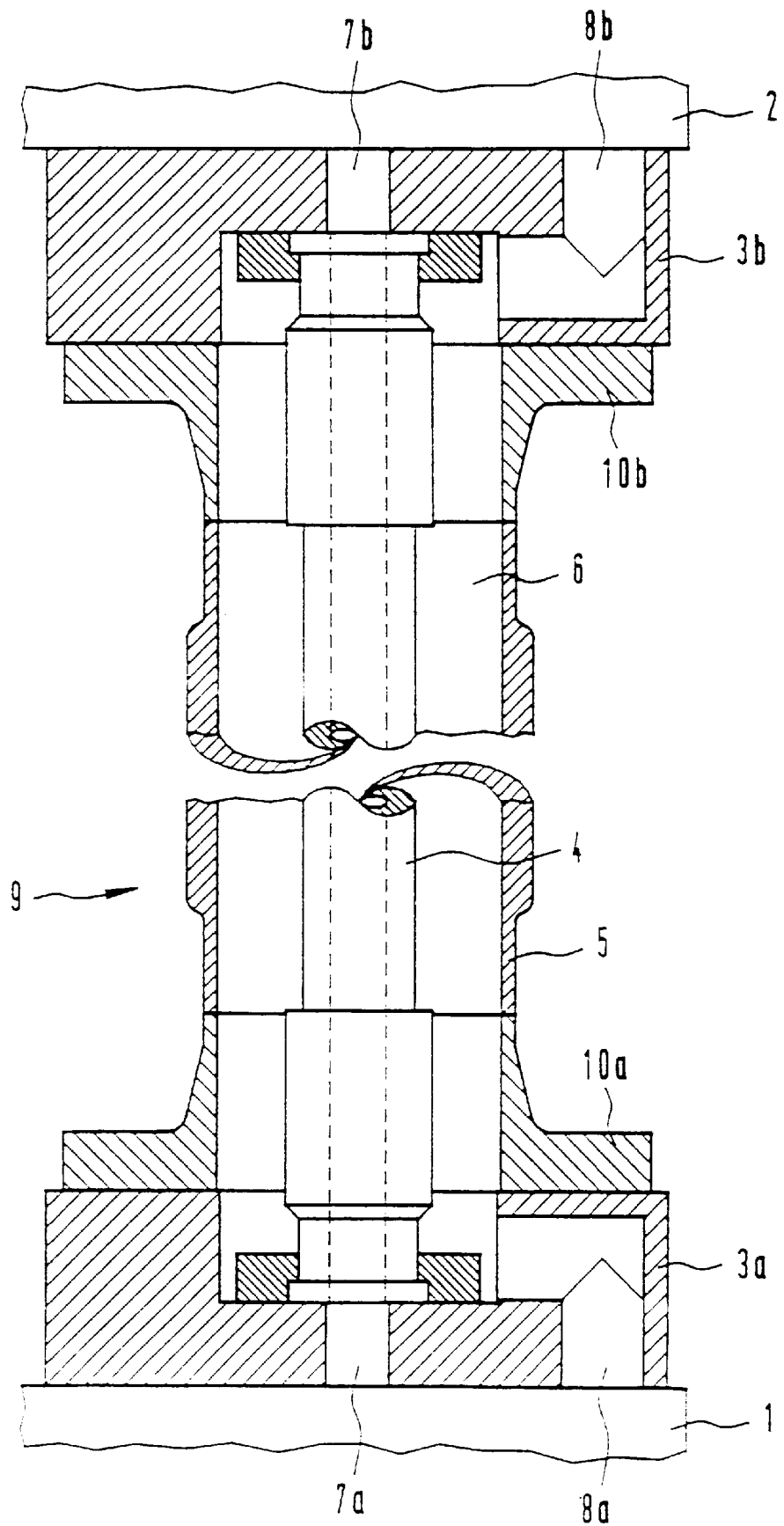

FLUID LINE WITH INTEGRATED UNPRESSURIZED RETURN FLOW

BACKGROUND OF THE INVENTION

The invention relates to a fluid conduit which comprises at least one inner conduit, which is surrounded by a leaktight, burst-proof jacket and can be subjected to internal pressure.

DE 37 39 937 A1 describes a pressure conduit for fuel comprising a pressure pipe, a jacket pipe surrounding the latter with a narrow clearance and leakage-fuel passages extending in the longitudinal direction between both pipes. On its outer curved surface, the pressure pipe, which is produced in one piece from solid material, has at least one flat for the formation of leakage-fuel passages in the form of circular segments. A pressure conduit of this kind for fuel is said to be simple to produce and to have the greatest possible dimensional stability and hence durability, even in bending, so as to reduce the risk that the pressure pipe will crack.

Regulating devices are known which are operated hydraulically. Such hydraulic regulating devices can be operated at high pressures. The pressure in the feed conduits can, for example, be up to 140 bar, and the inside diameter chosen for the feed conduit can be relatively small. The high working pressure within the hydraulic conduits requires special measures at the coupling points or flange joints as regards sealing. Leaks would lead to unwanted pressure loss and to contamination of the environment. In the case of regulating devices for turbo machines, in particular industrial turbines and turbo generators, there is furthermore the risk of fire if the hydraulic fluid is a combustible fluid.

One known method of avoiding unwanted consequences of any oil leaks such as the escape of leakage oil and the risk of fires is to surround a pressure-transmitting inner conduit with a hydraulically leaktight, burst-proof jacket. One such proposal is described, for example, in DE 33 35 580 A1.

Owing to the fact that the inner conduit is provided with a jacket at a certain clearance, the required installation volume for such a conduit is increased. In addition to a pressure-transmitting feed conduit, there is also a requirement with a control or regulating device for a return conduit which forms a return for the hydraulic fluid, since the hydraulic fluid has to be recirculated. This increases the space requirement for the conduits of control and regulating devices.

SUMMARY OF THE INVENTION

The object on which the present invention is based is to specify a fluid conduit with a small space requirement and a high degree of safety.

According to one aspect of the invention, there is provided a fluid conduit which comprises: an inner conduit which is subjectable to internal pressure, and a hydraulically leaktight, burst-proof jacket which surrounds the inner conduit, wherein the space between the inner conduit and the jacket forms an unpressurized outer conduit, wherein the inner conduit is a feed conduit and the outer conduit forms a return conduit.

The fluid conduit, which comprises at least one inner conduit, which is surrounded by a hydraulically leaktight, burst-proof jacket and can be subjected to internal pressure, is distinguished by the fact that the space between the inner conduit and the jacket forms an unpressurized outer conduit. This design provides a fluid conduit in which the outer conduit forms an integrated return for a hydraulic fluid. It thus does not require a special additional return conduit since the two conduits, namely the first, pressure-transmitting inner conduit and the second, unpressurized outer conduit, are integrated into a single fluid conduit. The expression unpressurized outer conduit is also intended to convey the fact that the pressure of the hydraulic fluid in the outer conduit can be considerably lower than the pressure of the hydraulic fluid in the pressure-transmitting inner conduit. The unpressurized outer conduit can be connected to a reservoir without any significant restrictor elements in between, making it impossible for any significant pressure to build up in it, even where relatively large quantities of fluid are supplied. If the inner conduit bursts, the hydraulic fluid is taken up by the outer conduit, as a result of which a pressure reduction takes place in the inner conduit and the hydraulic fluid emerging from the inner conduit is passed to the reservoir.

To couple the fluid conduit to, for example, a pressure pump, it has, at at least one end, a coupling which comprises at least one pressure passage—which is connected to the inner conduit—and has at least one passage, which is connected to the outer conduit. Such a coupling can also be used to connect two fluid conduits of identical construction.

The pressure passage is preferably formed in the coupling coaxially, in particular concentrically, with respect to the inner conduit. Difficulties in connecting the coupling to a further coupling or connecting the coupling to, for example, a supply device are thereby avoided. An embodiment is preferred in which the coupling is formed essentially from plates which lie one on top of the other and into which the pressure passage and the passage that can be connected to the inner conduit have been machined before assembly.

The fluid conduit is preferably used for the hydraulic regulating devices of a machine, in particular for actuators of a turbo machine, in particular of an industrial turbine. Here, the inner conduit, as a pressure-transmitting feed conduit, on the one hand, and the outer conduit, as an unpressurized outer conduit, on the other hand, connect components of a hydraulic supply unit to one another or a supply device to at least one drive unit (actuator) of the machine.

BRIEF DESCRIPTION OF THE DRAWINGS

Further advantages and features of the fluid conduit will be explained with reference to a preferred exemplary embodiment, which is illustrated in the drawing.

DETAILED DESCRIPTION OF THE INVENTION

Arranged between a supply device 1 and an actuator 2, which are indicated only schematically in the drawing, is a fluid conduit 9. The fluid conduit 9 comprises an inner conduit 4, which is surrounded by a hydraulically leaktight, burst-proof jacket 5. The inner conduit 4 and the jacket 5 are of essentially circular design in cross-section and are arranged concentrically to one another. The space between the inner conduit 4 and the jacket 5, said space being of annular cross-section, forms an unpressurized outer conduit 6. Provided at each end of the conduit 9 is a coupling 3*a*, 3*b*, each of which is connected at one side, by way of a respective flange 10*a*, 10*b*, to the jacket 5. The connection of the flanges 10*a*, 10*b* to the coupling 3*a*, 3*b* can be made by way of screw joints (not shown). Each coupling 3*a*, 3*b* has a central pressure passage 7*a*, 7*b* which is connected in a hydraulically leaktight manner to the inner conduit 4. The pressure passage 7*a*, 7*b* is formed coaxially with respect to the inner conduit 4. The outer conduit 6 is connected to a passage 8a, 8b formed in the coupling 3a, 3b.

The pressurized hydraulic fluid, e.g. pressurized oil, flows from the supply device 1, via pressure passage 7a in coupling 3a, into the inner conduit 4. The hydraulic fluid flows out of the inner conduit 4, via pressure passage 7b in coupling 3b, to the actuator 2. The actuator 2 can be an actuator which is used to actuate valves in a turbine. The largely unpressurized hydraulic fluid flows back from the actuator 2, via passage 8b in coupling 3, into the outer conduit 6. The hydraulic fluid leaves the outer conduit 6 via passage 8a in coupling 3a and flows back into the supply device 1. The returning hydraulic fluid can, for example, flow into a reservoir (not shown) of the supply device 1.

What is claimed is:

1. A fluid conduit which comprises:

an inner conduit which is subjectable to internal pressure; a hydraulically leaktight burst-proof jacket which surrounds the inner conduit wherein the space between the inner conduit and the jacket forms an unpressurized outer conduit wherein the inner conduit is a feed conduit and the outer conduit forms a return conduit;

at least one coupling; a flange connected side-by-side to said at least one coupling, said flange being integrally formed with said jacket; at least one pressure passage connected to the inner conduit formed in said coupling; and at least one passage connected to the outer conduit formed in said coupling.

2. A fluid conduit according to claim 1, wherein said pressure passage is formed coaxially with respect to the inner conduit.

3. A fluid conduit according to claim 1, wherein said at least one coupling is formed from plates which lie one on top of the other and into which said at least one pressure passage and said passage are machined.

4. A fluid conduit according to claim 1, wherein said fluid conduit is a conduit in a regulating device of a machine, wherein the inner conduit is a pressure-transmitting feed conduit, and wherein said outer conduit is an unpressurized return conduit, wherein said fluid conduit connects components of a hydraulic supply device to one another.

5. A fluid conduit according to claim 1, wherein said pressure passage is formed concentrically with respect to said inner conduit.

6. A fluid conduit according to claim 1, wherein said fluid conduit is a conduit in an actuator of a turbo machine, wherein said inner conduit is a pressure-transmitting feed conduit, and wherein said outer conduit is an unpressurized return conduit, wherein said fluid conduit connects components of a hydraulic supply device to one another.

7. A fluid conduit according to claim 1, wherein said fluid conduit is a conduit in a regulating device of a machine, wherein said inner conduit is a pressure-transmitting feed conduit, and wherein said outer conduit is an unpressurized return conduit, wherein said fluid conduit connects to a supply device to at least one actuator.

* * * * *